United States Patent
Ikenoue et al.

(10) Patent No.: US 12,288,314 B2
(45) Date of Patent: Apr. 29, 2025

(54) IMAGE DISPLAYING SYSTEM, DISPLAY APPARATUS, AND IMAGE DISPLAYING METHOD

(71) Applicant: Sony Interactive Entertainment Inc., Tokyo (JP)

(72) Inventors: Shoichi Ikenoue, Chiba (JP); Kenichiro Yokota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/261,193

(22) PCT Filed: Dec. 21, 2021

(86) PCT No.: PCT/JP2021/047241
§ 371 (c)(1),
(2) Date: Jul. 12, 2023

(87) PCT Pub. No.: WO2022/158221
PCT Pub. Date: Jul. 28, 2022

(65) Prior Publication Data
US 2024/0087101 A1    Mar. 14, 2024

(30) Foreign Application Priority Data
Jan. 25, 2021    (JP) .................................. 2021-009864

(51) Int. Cl.
*G06T 5/80* (2024.01)
*G06F 3/01* (2006.01)
(Continued)

(52) U.S. Cl.
CPC ................ *G06T 5/80* (2024.01); *G06F 3/013* (2013.01); *G06T 7/90* (2017.01); *G06T 9/00* (2013.01)

(58) Field of Classification Search
None
See application file for complete search history.

(56) References Cited

U.S. PATENT DOCUMENTS

| 8,248,437 B2 | 8/2012 | Yamaguchi |
| 10,156,724 B2 | 12/2018 | Shimazu |
| (Continued) | | |

FOREIGN PATENT DOCUMENTS

| JP | 01141479 A | 6/1989 |
| JP | 07135651 A | 5/1995 |
| (Continued) | | |

OTHER PUBLICATIONS

International Search Report for related PCT Application No. PCT/JP2021/047240, 6 pages, dated Mar. 15, 2022.
(Continued)

*Primary Examiner* — Andre L Matthews
(74) *Attorney, Agent, or Firm* — Kilpatrick Townsend & Stockton LLP (57) ABSTRACT

A state information acquisition section of an image generation apparatus acquires state information of the head of a user. An image generation section generates a display image corresponding to a visual field. A down-sampling section down-samples image data and transmits the down-sampled image data from a transmission section. A distortion correction section of a head-mounted display performs, after an up-sampling section up samples the data, correction according to aberration of the eyepiece, for each primary color and causes the resulting data to be displayed on a display section.

20 Claims, 8 Drawing Sheets

(51) Int. Cl.
   *G06T 7/90*   (2017.01)
   *G06T 9/00*   (2006.01)

(56) References Cited

U.S. PATENT DOCUMENTS

| | | | |
|---|---|---|---|
| 10,334,237 B2 | 6/2019 | Inada | |
| 10,475,370 B2 | 11/2019 | Spitzer | |
| 10,664,953 B1* | 5/2020 | Lanman | G06N 3/08 |
| 10,965,929 B1* | 3/2021 | Bellows | H04N 13/122 |
| 11,442,266 B1* | 9/2022 | Kermani | G06T 5/80 |
| 2009/0315887 A1 | 12/2009 | Yamaguchi | |
| 2016/0227203 A1 | 8/2016 | Tetsugo | |
| 2017/0236466 A1 | 8/2017 | Spitzer | |
| 2017/0316607 A1 | 11/2017 | Khalid | |
| 2017/0330349 A1 | 11/2017 | Kolesnikov | |
| 2018/0074321 A1* | 3/2018 | Shimazu | G02B 27/02 |
| 2018/0190236 A1* | 7/2018 | Philipp | G09G 5/005 |
| 2020/0269133 A1* | 8/2020 | Sun | H04N 19/70 |
| 2020/0410206 A1* | 12/2020 | Reynolds | G06V 10/98 |
| 2022/0245832 A1* | 8/2022 | Gupte | G06T 7/246 |

FOREIGN PATENT DOCUMENTS

| | | |
|---|---|---|
| JP | 07288806 A | 10/1995 |
| JP | 099253 A | 1/1997 |
| JP | 10327373 A | 12/1998 |
| JP | 2004233869 A | 8/2004 |
| JP | 2005130251 A | 5/2005 |
| JP | 2008131321 A | 6/2008 |
| JP | 2010004176 A | 1/2010 |
| JP | 2014077993 A | 5/2014 |
| JP | 2016140017 A | 8/2016 |
| JP | 2016212351 A | 12/2016 |
| JP | 2017215875 A | 12/2017 |
| JP | 2019507380 A | 3/2019 |
| WO | 2019092463 A1 | 5/2019 |

OTHER PUBLICATIONS

International Search Report for corresponding PCT Application No. PCT/JP2021/047241, 6 pages, dated Mar. 15, 2022.
Decision to Grant a Patent issued in corresponding JP Patent Application No. 2021-009864 on Sep. 3, 2024; 5 pages.

* cited by examiner

IMAGE DISPLAYING SYSTEM, DISPLAY APPARATUS, AND IMAGE DISPLAYING METHOD

TECHNICAL FIELD

The present invention relates to an image displaying system that includes an image generation apparatus and a display apparatus, a display apparatus for use with the image displaying system, and an image displaying method.

BACKGROUND ART

An image displaying system by which a target space can be appreciated from a free viewpoint has become popular. For example, there is known an electronic content which determines a virtual three-dimensional space as a display target and displays an image according to a direction of a visual line of a user wearing a head-mounted display, to thereby implement VR (Virtual Reality). By using the head-mounted display, it is also possible to enhance the immersion feeling in a video and improve the operability of an application such as a game. Also there has been developed a walkthrough system which allows, when a user wearing a head-mounted display physically moves, the user to virtually walk around in a space displayed as a video.

SUMMARY

Technical Problems

In a case where a visual field changes or the displayed world moves, high responsibility is demanded for image display irrespective of the type of the display apparatus and the degree of freedom of the viewpoint. On the other hand, in order to implement a more realistic image representation, the resolution is increased or complicated calculation becomes required, and this increases the cost for image processing and data transmission. Therefore, it possibly occurs that the display does not follow up a movement of the visual field or the display world, and on the contrary, it possibly occurs that the sense of presence is lost or the user suffers from motion sickness.

Further, in a case where the display apparatus is a head-mounted display, it is desired from the viewpoint of easy movement of the user that a system for drawing an image is disconnected from the head-mounted display and wireless communication is used for the communication between them. However, if the amount of data to be transmitted increases as described above, then, by the wireless transmission, data is lost midway or some delay occurs, by which the risk that the stability in display is compromised increases.

The present invention has been made in view of such problems as described above, and the object of the present invention resides in provision of a technology that makes it possible to display, in a system including an image generation apparatus and a display apparatus, an image of high quality stably irrespective of the communication environment between them.

Solution to Problem

In order to solve the subject described above, a certain mode of the present invention relates to an image displaying system. The image displaying system is an image displaying system that displays, in order to allow appreciation through an eyepiece, a distortion image in which, to an image of a display target, an opposite change to a change by aberration of the eyepiece is provided. The image displaying system includes an image generation apparatus that down-samples and transmits data of the image, and a display apparatus that up-samples the data transmitted thereto, performs distortion correction for providing the opposite change for each primary color on the basis of chromatic aberration, and displays the resulting data.

Another mode of the present invention relates to a display apparatus. The display apparatus is a display apparatus for allowing appreciation of an image through an eyepiece. The display apparatus includes an image data acquisition section that acquires data of an image transmitted from an external apparatus, part of the data being in a down-sampled state, an up-sampling section that up-samples the part of the data, a distortion correction section that performs distortion correction for providing, to the up-sampled image, an opposite change to a change by aberration of the eyepiece, for each primary color, and a displaying section that displays the image for which the distortion correction has been performed.

A further mode of the present invention relates to an image displaying method. The image displaying method is an image displaying method performed by a display apparatus for allowing appreciation of an image through an eyepiece. The image displaying method includes a step of acquiring data of an image transmitted from an external apparatus, part of the data being in a down-sampled state, a step of up-sampling the part of the data, a step of performing distortion correction for providing, to the up-sampled image, an opposite change to a change by aberration of the eyepiece, for each primary color, and a step of displaying the image for which the distortion correction has been performed.

It is to be noted that any combination of the components described above and representations of the present invention where they are converted between a method, an apparatus, a system, a computer program, a data structure, a recording medium, and so forth are also effective as modes of the present invention.

Advantageous Effect of Invention

According to the present invention, in the system including the image generation apparatus and the display apparatus, an image of high quality can be stably displayed irrespective of the communication environment between them.

DESCRIPTION OF EMBODIMENT

Figure 1:
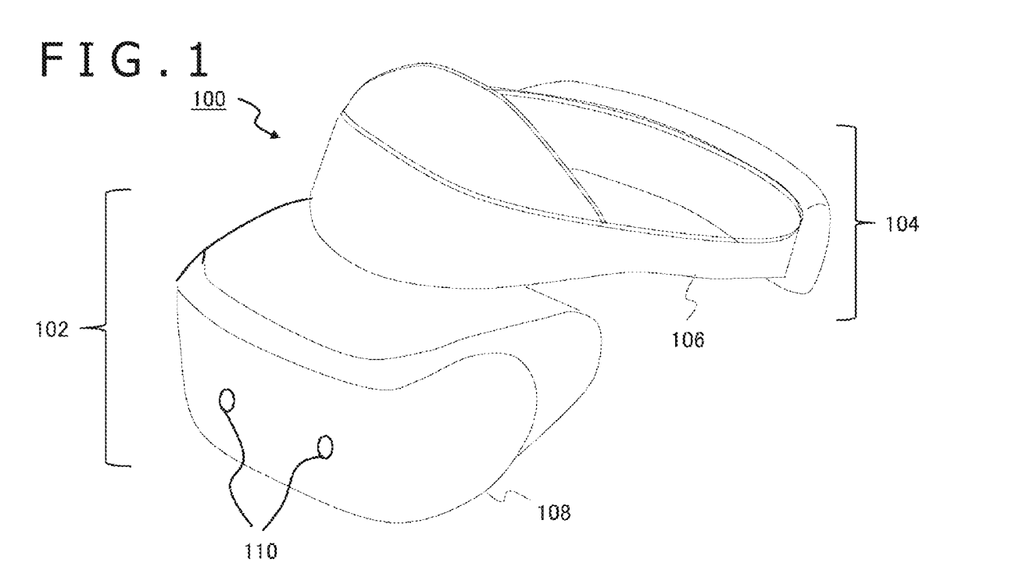
FIG. 1 is a view depicting an example of an appearance of a head-mounted display of the present embodiment.

The present embodiment relates to an image displaying system of the type in which a display image is appreciated through a lens. To this extent, the type of the display apparatus is not restricted specifically. However, the description here is given taking a head-mounted display as an example. FIG. 1 depicts an example of an appearance of a head-mounted display 100. In this example, the head-mounted display 100 includes an outputting mechanism section 102 and a mounting mechanism section 104. The mounting mechanism section 104 includes a mounting band 106 that extends, when a user wears the head-mounted display 100, around the head of the user to implement fixation of the apparatus.

The outputting mechanism section 102 includes a housing 108 shaped in such a manner as to, in a state in which the user wears the head-mounted display 100, cover the left and right eyes of the user, and a display panel that faces the eyes when the head-mounted display 100 is worn by the user is provided in the inside of the housing 108. In the inside of the housing 108, further provided are eyepieces which are positioned, when the head-mounted display 100 is worn by the user, between the display panel and the eyes of the user and enlarge the viewing angle of the user. The head-mounted display 100 may further include a speaker and an earphone at positions corresponding to the ears of the user when the head-mounted display 100 is worn by the user. Further, the head-mounted display 100 has a motion sensor built therein such that the motion sensor detects not only a translation motion and a rotation motion of the head of the user wearing the head-mounted display 100 but also a position and a posture of the head of the user at each time.

In the present example, the head-mounted display 100 includes a stereo camera 110 on the front face of the housing 108 and captures a moving image of an actual space in the surroundings with a visual field corresponding to a visual line of the user. If the captured image is displayed immediately, then what is generally called video see-through by which the appearance of the actual space in a direction in which the user is facing looks as it is can be implemented. Further, if a virtual object is drawn on a picture of an actual object in the captured image, then augmented reality can be implemented.

Figure 2:
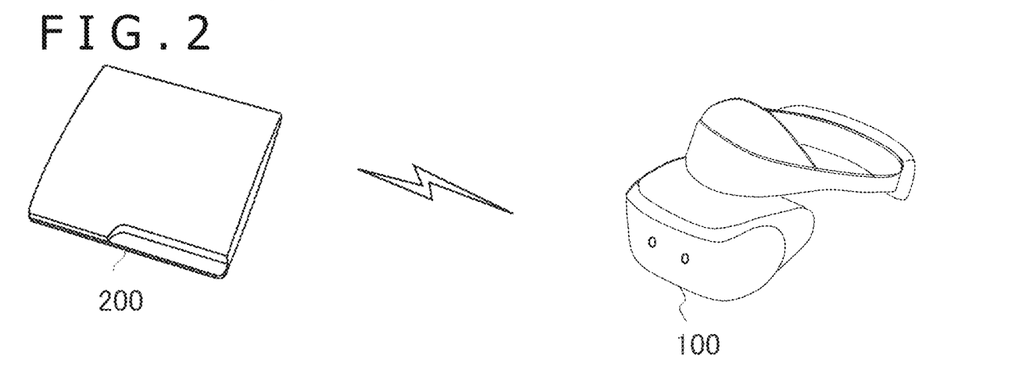
FIG. 2 is a view depicting an example of a configuration of an image displaying system of the present embodiment.

FIG. 2 depicts an example of a configuration of an image displaying system in the present embodiment. The head-mounted display 100 is connected to an image generation apparatus 200 by wireless communication. The image generation apparatus 200 may be connected further to a server through a network. In this case, the server may provide an on-line application such as a game in which a plurality of users can participate through the network to the image generation apparatus 200.

The image generation apparatus 200 identifies the position of the viewpoint and the direction of the visual line on the basis of the position of the head and the posture of the user wearing the head-mounted display 100, generates a display image such that the display image has a visual field according to a result of the identification and outputs the display image to the head-mounted display 100. To this extent, the image may be displayed for various purposes. For example, the image generation apparatus 200 may generate a virtual world, which is a stage of an electronic game, as a display image while the game is progressed, or may cause a moving image to be displayed for the object of appreciation or information provision regardless of whether the virtual world is the actual world. If a panorama image is displayed with a wide angle of view centered at the viewpoint of the user, then a feeling that the user is immersed in the display world can be provided to the user.

Figure 3:
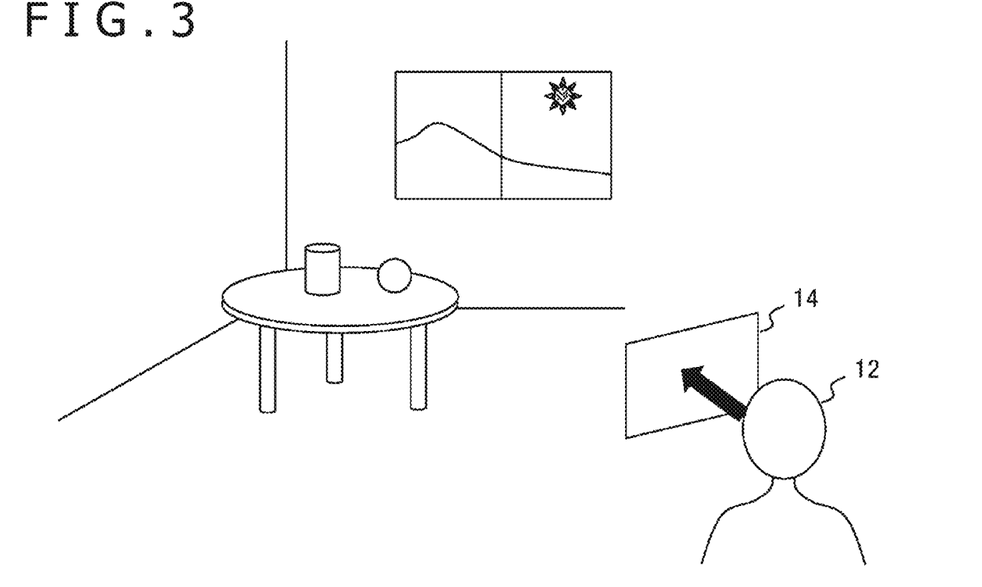
FIG. 3 is a view illustrating an example of an image world displayed on the head-mounted display by an image generation apparatus of the present embodiment.

FIG. 3 is a view illustrating an example of an image world displayed on the head-mounted display 100 by the image generation apparatus 200 in the present embodiment. In the present example, a user 12 creates a state in which the user 12 is in a room that is a virtual space. In a world coordinate system that defines the virtual space, such objects as a wall, a floor, a window, a table, and articles on the table are disposed as depicted in FIG. 3. The image generation apparatus 200 defines, in the world coordinate system, a viewscreen 14 according to the position of the viewpoint and the direction of the visual line of the user 12, and a picture of the objects is represented to draw a display image.

If the position of the viewpoint and the direction of the visual line of the user 12 (hereafter, they are comprehensively referred to as a "viewpoint" in some cases) are acquired at a predetermined rate and the position or the direction of the viewscreen 14 is changed according to the viewpoint, then the image can be displayed in the visual field corresponding to the viewpoint of the user. If a stereo image having a parallax therebetween are generated and displayed individually in left and right regions of the display panel, then it is also possible to allow the virtual space to be stereoscopically viewed. This makes it possible for the user 12 to experience such virtual reality that the user 12 can feel as if the user 12 were in a room of the display world.

Figure 4:
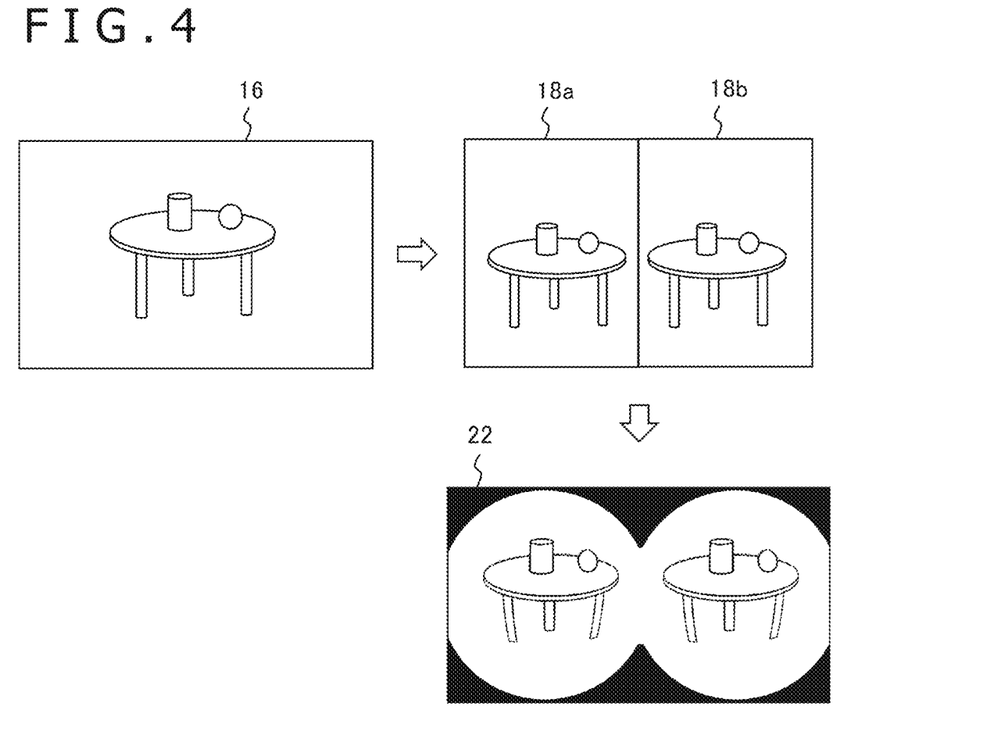
FIG. 4 is a view depicting an example of a processing procedure until an image to be displayed on the head-mounted display is generated in the present embodiment.

FIG. 4 depicts an example of a processing procedure until an image to be displayed on the head-mounted display is generated in the mode depicted in FIG. 3. First, an image 16 corresponding to the visual field of the user is generated by projecting an object existing in a virtual world to a viewscreen corresponding to the viewpoint of the user. This process actually is a process of converting coordinates of vertices of the object in a world coordinate system that defines the virtual world into those of a coordinate system of the viewscreen and mapping a texture to a plane configuring the object. The image represents a picture to be visually recognized by the user originally.

In a case where stereoscopic viewing is to be achieved, a stereo image including a left eye image 18a and a right eye image 18b are generated by displacing a picture in the image 16 in a horizontal direction by an amount corresponding to the parallax according to the distance between the left and right eyes or by generating the image 16 for each of the eyes. Then, distortion correction is performed individually for the left eye image 18a and the right eye image 18b according to distortion aberration or chromatic aberration by the eyepieces to generate a final display image 22.

Here, the distortion correction is a process for providing an opposite change to a change by aberration of a lens to distort an image in advance or displace pixels for each primary color (R, G, and B). For example, in a case of a lens from which an image looks such that the four sides thereof are recessed like those of a bobbin, the image is distorted into a barrel shape in advance as depicted in FIG. 4. Consequently, when the user looks at the display image 22 through the eyepieces, the original image 16 is recognized without distortion or color drift. An image to which distortion or color drift corresponding to an eyepiece is provided is hereinafter referred to as a "distortion image."

Figure 5:
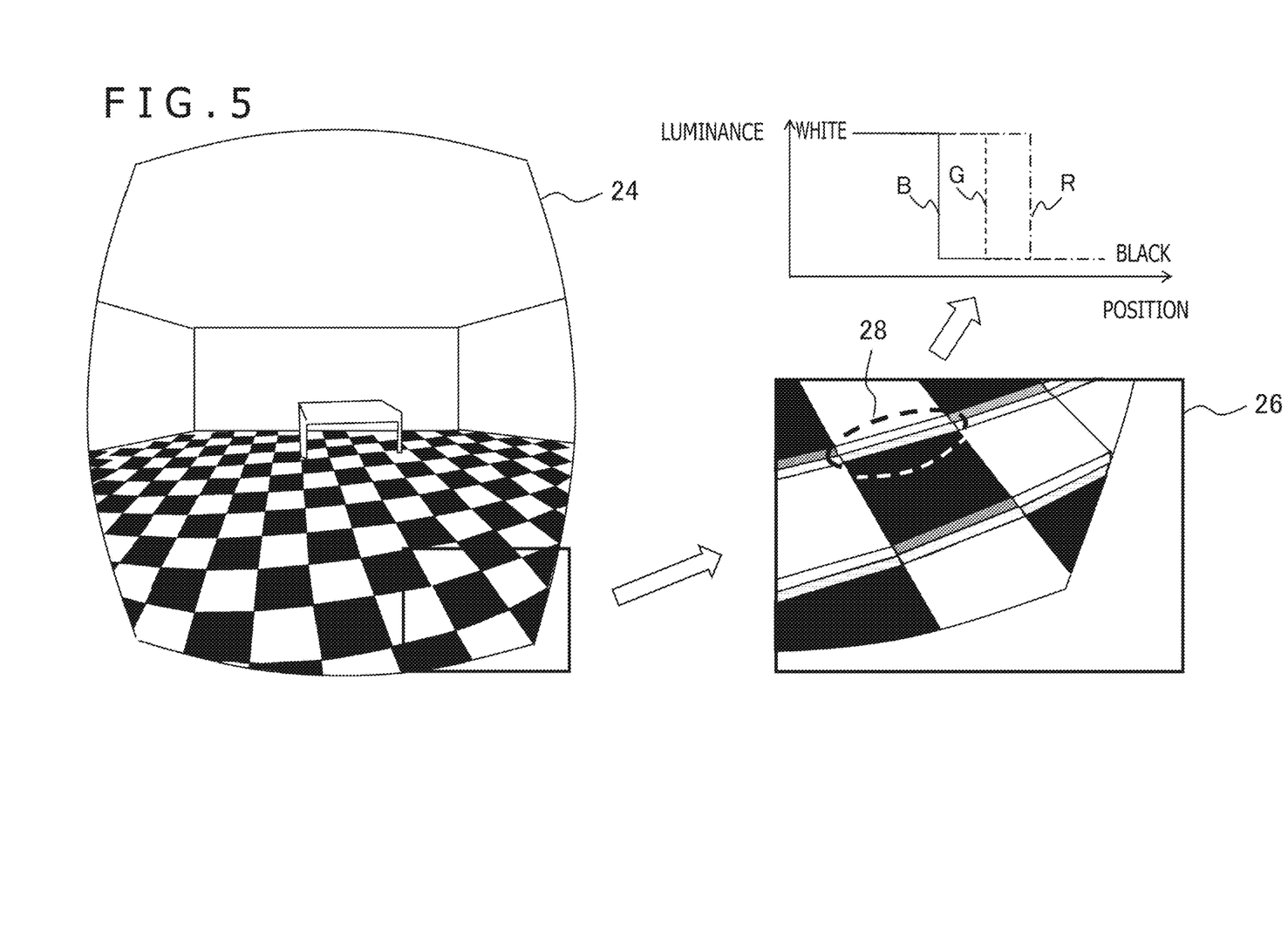
FIG. 5 is a view illustrating color drift on a distortion image in the present embodiment.

FIG. 5 is a view illustrating color drift in a distortion image. In this example, a distortion image 24 represents the inside of a room having a floor of a black and white checkered pattern. As depicted in FIG. 5, to the distortion image 24, distortion is provided such that the degree thereof increases toward peripheral portions, due to a characteristic of the eyepieces. Depending upon the chromatic aberration of the eyepieces, the degree of the provided distortion differs among the primary colors of R (red), G (green), and B (blue). As a result, in the distortion image 24, color drift occurs in such a manner as to increase toward the peripheral portions. For example, as depicted in an image 26 in which a lower right region of the distortion image 24 is enlarged, the color gradually changes at a location 28 that originally represents the boundary between black and white.

In particular, as depicted in the upper stage of FIG. 5, the boundary at which changeover from white to black occurs differs among R, G, and B, and therefore, for example, red remains with a maximum luminance at a portion that originally is to be a black region, resulting in appearance of a color other than white or block. When the distortion image 24 that suffers from color drift in such a manner is viewed through the eyepieces, the change in color is corrected to a correct position by the chromatic aberration, and an image having no color drift can be visually recognized. The distortion image 24 can be generated, for example, by generating an image having no distortion once and then distorting the image by a degree according to the aberration different for each primary color.

The generation and displaying procedure of an image depicted in FIG. 4 is the simplest procedure and can be implemented well in a case where, for example, it is completed in the inside of the head-mounted display 100. On the other hand, in a case where the image generation function is separated from the head-mounted display 100 and data transmission between them is implemented by wireless communication as in the image displaying system depicted in FIG. 2, it is a problem how to suppress the size of data to be transmitted, to achieve stable image display.

For the experience of a real video of high quality, expansion of the resolution or the dynamic range is required. When an image of such a large data size is created by the image generation apparatus 200 side that has abundant process resources, it becomes possible to output the image with a low delay, and also it is facilitated to suppress cost of the processing performed by the head-mounted display 100 and achieve reduction in weight. However, wireless communication becomes a bottleneck, and the risk that, as the data size increases, the display becomes unstable increases.

Therefore, the image generation apparatus 200 in the present embodiment decreases the size once by down-sampling of sampling out part of data from an image generated once and then transmits the resulting image to the head-mounted display 100. Various methods are available for the down-sampling, and a possible method is to sample out data only of color difference components of the image. In particular, the image generation apparatus 200 converts RGB image data generated once into three components of Y (luminance), U (color difference of B), and V (color difference of red) and then samples out data from the U and V color difference components.

This method is a data compression method that utilizes the human visual characteristic that the sensitivity to a change in color is low in comparison with that to a change in luminance, and is known as chroma sampling. The image generation apparatus 200 may suitably encode and transmit image data down-sampled in such a manner to the head-mounted display 100. The head-mounted display 100 suitably decodes the data transmitted thereto, complements the data that has been sampled out, and performs component transformation to generate an RGB image of the original size to be displayed. Consequently, also by wireless communication, an image of a large data size can be displayed stably.

Figure 6:
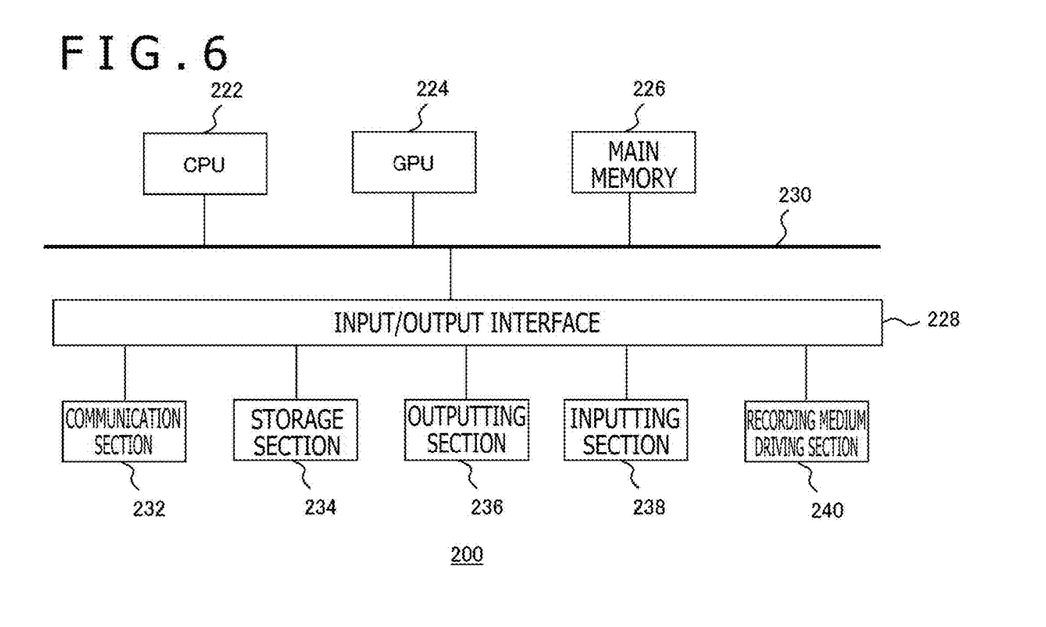
FIG. 6 is a diagram depicting a configuration of an internal circuit of the image generation apparatus of the present embodiment.

FIG. 6 depicts a configuration of an internal circuit of the image generation apparatus 200. The image generation apparatus 200 includes a CPU (Central Processing Unit) 222, a GPU (Graphics Processing Unit) 224, and a main memory 226. The components mentioned are connected to each other by a bus 230. To the bus 230, an input/output interface 228 is further connected.

To the input/output interface 228, peripheral equipment interfaces of a USB (Universal Serial Bus) and IEEE (Institute of Electrical and Electronics Engineers) 1394, a communication section 232 including a network interface of a wired or wireless LAN (Local Area Network), a storage section 234 such as a hard disk drive or a nonvolatile memory, an outputting section 236 that outputs data to the head-mounted display 100, an inputting section 238 to which data from the head-mounted display 100 is inputted, and a recording medium driving section 240 that drives a removable recording medium such as a magnetic disk, an optical disk, or a semiconductor memory are connected.

The CPU 222 executes an operating system stored in the storage section 234, to control the overall image generation apparatus 200. The CPU 222 further executes various programs read out from the removable recording medium and loaded in the main memory 226 or downloaded via the communication section 232. The GPU 224 has a function of a geometry engine and a function of a rendering processor, and performs a drawing process in accordance with a drawing command from the CPU 222 and outputs a result of the drawing process to the outputting section 236. The main memory 226 includes a RAM (Random Access Memory) and stores a program and data necessary for processing.

Figure 7:
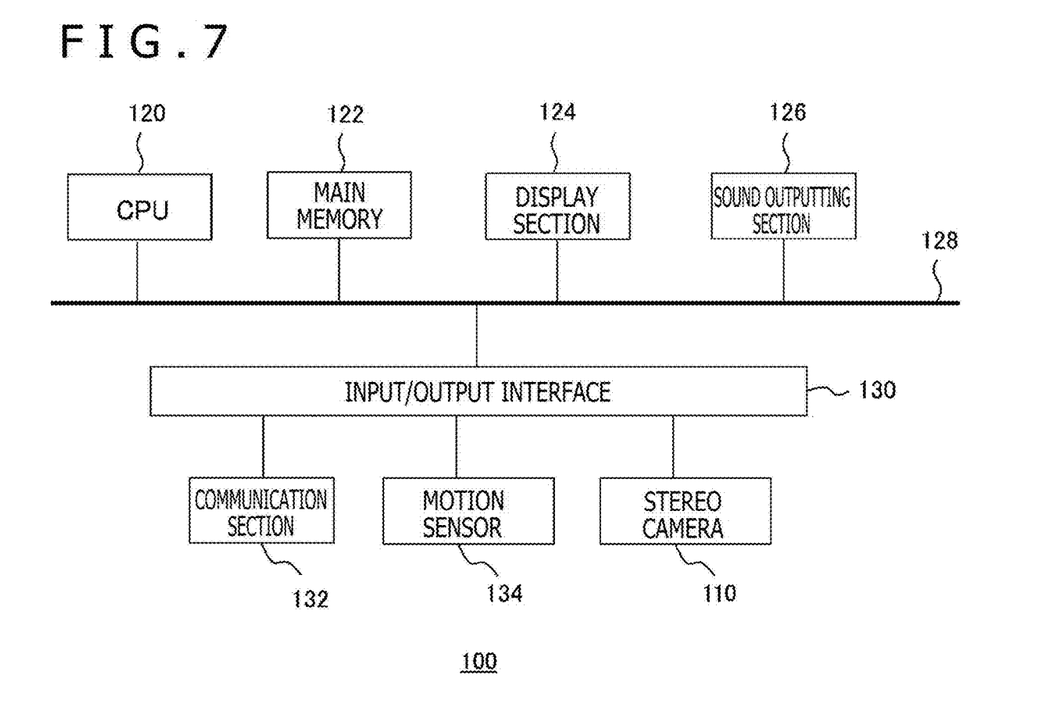
FIG. 7 is a diagram depicting a configuration of an internal circuit of the head-mounted display of the present embodiment.

FIG. 7 depicts a configuration of an internal circuit of the head-mounted display 100. The head-mounted display 100 includes a CPU 120, a main memory 122, a display section 124, and a sound outputting section 126. The components mentioned are connected to each other by a bus 128. Further, an input/output interface 130 is connected to the bus 128. To the input/output interface 130, a communication section 132 including an interface for wireless communication, a motion sensor 134, and a stereo camera 110 are connected.

The CPU 120 processes information acquired from the components of the head-mounted display 100 through the bus 128 and supplies a display image and sound data acquired from the image generation apparatus 200, to the display section 124 and the sound outputting section 126. The main memory 122 stores a program and data necessary for processing by the CPU 120.

The display section 124 includes a display panel such as a liquid crystal panel or an organic EL (Electroluminescent) panel and displays an image in front of the eyes of the user wearing the head-mounted display 100. As described hereinabove, stereoscopic viewing may be implemented by displaying a pair of stereo images in regions corresponding to the left and right eyes. The display section 124 further includes a pair of lenses that are positioned between the display panel and the eyes of the user when the head-mounted display 100 is worn by the user and that enlarge the viewing angle of the user.

The sound outputting section 126 includes a speaker or an earphone provided at a position corresponding to each of the eyes of the user when the head-mounted display 100 is worn by the user, and emits sound to be heard by the user. The communication section 132 is an interface for sending and receiving data to and from the image generation apparatus 200, and implements communication by a known wireless communication technology such as Bluetooth (registered trademark). The motion sensor 134 includes a gyro sensor and an acceleration sensor and acquires an angular velocity and an acceleration of the head-mounted display 100.

The stereo camera 110 is a pair of video cameras that capture an image of an actual space in the surroundings from left and right viewpoints in a visual field corresponding to the viewpoint of the user, as depicted in FIG. 1. A measurement value by the motion sensor 134 and data of an image captured by the stereo camera 110 are transmitted to the image generation apparatus 200 via the communication section 132 as occasion demands.

Figure 8:
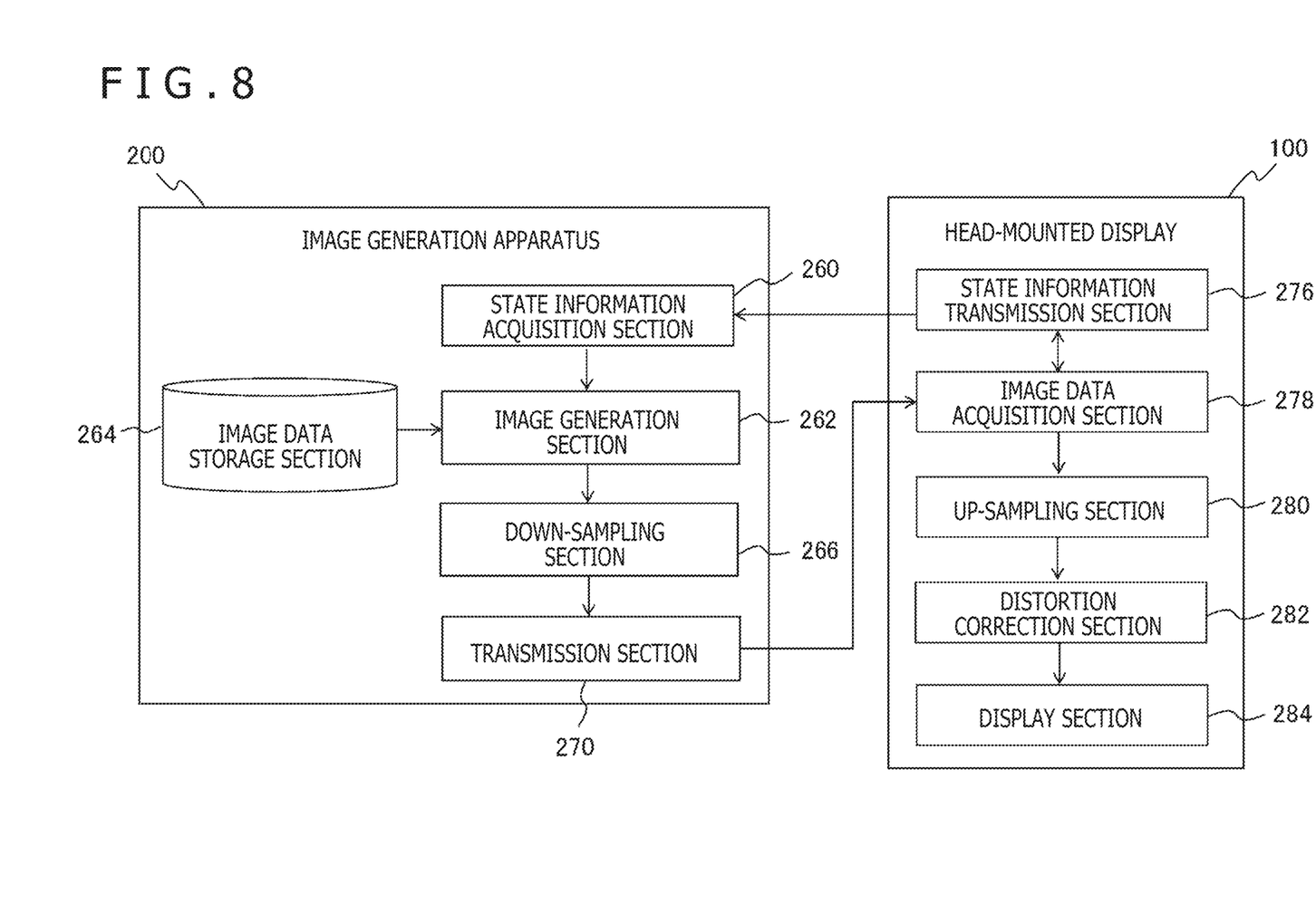
FIG. 8 is a diagram depicting a configuration of functional blocks of the image generation apparatus and the head-mounted display in the present embodiment.

FIG. 8 depicts a configuration of functional blocks of the image generation apparatus 200 and the head-mounted display 100 in the present embodiment. Although the image generation apparatus 200 may perform general information processing of causing an electronic game to progress or communicating with a server as described above, FIG. 8 depicts the image generation apparatus 200, especially focusing on the functions of generating and transmitting a display image. It is to be noted that at least some of the functions of the image generation apparatus 200 depicted in FIG. 8 may be incorporated otherwise in a server connected to the image generation apparatus 200 through a network.

Further, the functional blocks depicted in FIG. 8 can be implemented in hardware by such configurations of the CPU, the GPU, the various memories, and so forth depicted in FIGS. 6 and 7, and are implemented in software by a program that is loaded from a recording medium or the like into a memory and demonstrates such various functions as a data inputting function, a data retaining function, an image processing function, a communication function, and a displaying function. Accordingly, it is recognized by those skilled in the art that the functional blocks mentioned can be implemented in various forms only by hardware, only by software, or by a combination of hardware and software, and are not restricted to any one of them.

The image generation apparatus 200 includes a state information acquisition section 260 that acquires information relating to a real time state of the head-mounted display 100, an image generation section 262 that generates a display image, an image data storage section 264 that stores data to be used for generation of an image, a down-sampling section 266 that down-samples the generated image data, and a transmission section 270 that transmits the image data to the head-mounted display 100.

The state information acquisition section 260 includes the inputting section 238, the CPU 222, and so forth of FIG. 6 and acquires, at a predetermined rate, information regarding the position and the posture of the head of the user transmitted from the head-mounted display 100. Alternatively, the state information acquisition section 260 may acquire, at a predetermined rate, a measurement value of the motion sensor 134, data of an image captured by the stereo camera 110, and so forth, from the head-mounted display 100 and may itself calculate a position and a posture of the head of the user on the basis of at least one of them. As a method for acquiring a position or a posture from a captured image, an existing technology such as V-SLAM (Visual Simultaneous Localization and Mapping) can be used.

The image generation section 262 includes the CPU 222, the GPU 224, and so forth of FIG. 6 and generates a display image at a predetermined rate by the procedure depicted in FIG. 4 or the like. For example, the image generation section 262 sets a viewscreen corresponding to the viewpoint on the basis of information regarding the position and the posture of the head of the user and projects an object existing in a three-dimensional virtual space, to generate images for the left eye and the right eye. However, the image generation section 262 does not perform distortion correction according to the eyepieces of the head-mounted display 100.

As described hereinabove, in the present embodiment, in order to allow an image of a large data size to be transmitted stably even by wireless communication, down-sampling of data is performed. In a case where the down-sampling has irreversibility, when the head-mounted display 100 complements data, the image generated by the image generation section 262 is reproduced but not faithfully. Even if it is made less likely to notice this by taking such a countermeasure as to sample out only data of a color difference, since color drift by chromatic aberration described hereinabove with reference to FIG. 5 is information that depends upon a resolution of the single pixel level, there is a possibility that an influence of information loss by down-sampling may be visually recognized.

For example, it is possible that, even if distortion that is different for each primary color is provided to cause color drift on a contour of a picture or the like, if the distribution of such color drift becomes less clear by down-sampling, then, when the image is viewed through the eyepieces, a false color appears on the contour and a sufficient effect of correction is not obtained. Therefore, the image generation section 262 in the present embodiment ends the image generation process in a stage before distortion correction and sequentially supplies the data of the image to the down-sampling section 266.

Alternatively, the image generation section 262 may perform correction of providing common distortion to the three planes of R, G, and B. For example, the image generation section 262 generates a distortion image in which distortion to be provided only to G from among R, G, and B is provided to all planes. Since even such a process does not cause color drift for chromatic aberration, the information regarding the color drift is not lost by the down-sampling. It is to be noted that the image generation section 262 may otherwise generate an image in such a configuration that images which are for the left eye and the right eye have no distortion or images which are for the left eye and the right eye and to which common distortion is provided regardless of the primary colors are disposed on the left and the right of the image plane.

The image data storage section 264 includes the main memory 226 of FIG. 6 or the like and stores model data of an object of a display target or data relating to a configuration of a virtual space, information relating, in a case where distortion correction common to R, G, and B is to be performed, to the distortion, and so forth. It is to be noted that the display image to be generated by the image generation apparatus 200 is not limited to an image of a three-dimensional object and may be a panorama image captured separately, a real time image that is being captured by the stereo camera 110 of the head-mounted display 100, an image obtained by processing the image, or a like image.

Alternatively, the image generation apparatus 200 may acquire an image of various kinds of content, such as cloud gaming and a movie, transmitted thereto from an unillustrated server through a network and immediately decode and decompress the image. The down-sampling section 266 includes the CPU 222, the GPU 224, and so forth of FIG. 6 and performs down-sampling of sampling out part of data for each image frame generated by the image generation section 262. The down-sampling section 266 converts, for example, an original RGB image into a YUV image and reduces U and V planes of the YUV image to reduce data.

Here, the down-sampling section 266 may generate data of YUV420 by reducing the U and V planes to one half in both of the vertical and horizontal directions. Alternatively, the down-sampling section 266 may generate data of YUV422 by reducing the U and V planes to one half only in the horizontal direction. It is to be noted that the method of down-sampling performed by the down-sampling section 266 is not restricted to any of them.

The transmission section 270 includes the CPU 222, the GPU 224, the main memory 226, the outputting section 236, and so forth of FIG. 6 and sequentially sends out data of a down-sampled image to the head-mounted display 100. At this time, the transmission section 270 may transmit the down-sampled image to the head-mounted display 100 after performing compression encoding on the image by a predetermined method. For example, the transmission section 270 performs compression encoding by any one of MPEG (Moving Picture Experts Group) -4, H.264/MPEG-4 AVC (Advanced Video Coding), and H.265/MPEG-H HEVC (High Efficiency Video Coding) that are international standards for the video signal encoding method.

After down-sampling is performed in the format of YUV420 or YUV422 by the down-sampling section 266 as described above, the image of high quality can efficiently be transmitted and displayed with use of H.265/MPEG-H HEVC. However, this does not mean that the encoding method is limited to any of them.

The head-mounted display 100 includes a state information transmission section 276 that transmits information relating to a real time state of the head-mounted display 100, an image data acquisition section 278 that acquires data of an image transmitted from the image generation apparatus 200, an up-sampling section 280 that up-samples the acquired image data, a distortion correction section 282 that performs distortion correction for the image that has been up-sampled, and a display section 284 that displays the image that has been subjected to the distortion correction.

The state information transmission section 276 includes the CPU 120, the motion sensor 134, the stereo camera 110, the communication section 132, and so forth of FIG. 7 and transmits, at a predetermined rate, information relating to the position and the posture of the head of the user or measurement values or data of a captured image for deriving such information, to the image generation apparatus 200. The image data acquisition section 278 includes the CPU 120, the communication section 132, the main memory 122, and so forth of FIG. 7 and acquires data of an image transmitted from the image generation apparatus 200.

In a case where the transmitted image data is in a compression encoded form, the image data acquisition section 278 decodes and decompresses the data. The up-sampling section 280 includes the CPU 120, the main memory 122, and so forth of FIG. 7 and performs up-sampling for complementing pixel values sampled out, for each image frame decoded suitably. For example, in a case where a YUV image is a transmission target and the U and V planes are in a reduced state, the up-sampling section 280 enlarges the planes to their original size.

Then, the up-sampling section 280 converts an image including the YUV planes having standardized sizes into an RGB image. Although the RGB image after the conversion is equivalent to the image generated by the image generation section 262 in the image generation apparatus 200, some color difference information is lost in the RGB image. Also with such a process, deterioration of the picture quality on the user's perception is suppressed to the utmost. It is to be noted that it is sufficient if the process performed by the up-sampling section 280 is reverse to the process performed by the down-sampling section 266 in the image generation apparatus 200, and a particular procedure depends upon processing by the down-sampling section 266.

The distortion correction section 282 includes the CPU 120, the main memory 122, and so forth of FIG. 7 and performs correction of providing, for each up-sampled image frame, to each of the RGB planes, distortion at a different degree according to chromatic aberration. For example, the distortion correction section 282 samples and determines pixel values of position coordinates (x,y) of the distortion image from an image having no distortion, by the following correction expression.

$$\Delta x = (k_1 r^2 + k_2 r^4 + k_3 r^6 + \ldots)(x - c_x) \qquad [\text{Math. 1}]$$

$$\Delta y = (k_1 r^2 + k_2 r^4 + k_3 r^6 + \ldots)(y - c_y) \qquad (\text{expression 1})$$

Here, $(\Delta x, \Delta y)$ represent a displacement amount of a sampling point on an image having no distortion from the position coordinates (x,y), r represents a distance from the optical axis of the lens to the target pixel, and (Cx,Cy) represent the position of the optical axis of the lens. Further, $k_1, k_2, k_3, \ldots$ are lens distortion coefficients and depend upon the design of the lens and the wavelength band of the light, that is, upon R, G, and B. The order number of the correction is not restricted specifically. The distortion correction section 282 retains in the inside thereof a set of the lens distortion coefficients $k_1, k_2, k_3, \ldots$ for each of R, G, and B and calculates $(\Delta x, \Delta y)$ to perform sampling from a position that is different for each color.

Consequently, the value of each pixel of the distortion image is determined from values of R, G, and B obtained by sampling from different positions of the RGB image that has been up-sampled. It is to be noted that, according to the expression 1, the relation between the position coordinates (x,y) of a pixel in the distortion image and the displacement amounts $(\Delta x, \Delta y)$ to the sampling destination depends upon the lens distortion coefficients $k_1, k_2, k_3, \ldots$ that are fixed values for each of R, G, and B. Accordingly, the distortion correction section 282 may increase the efficiency of sampling by preparing data obtained when the position coordinates or the displacement amounts $(\Delta x, \Delta y)$ of the sampling destination are mapped for each primary color plane.

It is to be noted that, although the expression 1 is a typical expression for correcting distortion caused by an eyepiece, this does not signify that the calculation for distortion correction to be carried out in the present embodiment is restricted to this. On the other hand, in a case where an image in which common distortion is provided to R, G, and B is generated by the image generation apparatus 200, it is only necessary for the distortion correction section 282 to perform correction only by an amount of the remaining distortion.

For example, in a case where distortion corresponding to G is provided to all planes by the image generation apparatus 200, the displacement amounts ΔR(x,y), ΔG(x,y), and ΔB(x,y) of a pixel at the position coordinates (x,y) in a distortion image to the sampling destination of each component of R, G, and B are given by the following expressions.

$$\Delta R(x,y)=DR(x,y)-DG(x,y)$$

$$\Delta G(x,y)=0$$

$$\Delta B(x,y)=DB(x,y)-DG(x,y)$$

Here, DR(x,y), DG(x,y), and DB(x,y) are original displacement amounts of the components of R, G, and B from the position coordinates (x,y) to the sampling destination and are values obtained by substituting the lens distortion coefficients for R, G, and B into the expression 1. The display section 284 includes the CPU 120, the main memory 122, the display section 124, and so forth of FIG. 7 and drives the display panel such that images to which distortion is provided for individual colors by the distortion correction section 282 are displayed sequentially. It is to be noted that the display section 284 may acquire a current position and a current posture of the head of the user, carry out reprojection for correcting the visual field of the image on the basis of the acquired position and posture, and then output a resulting image to the display panel.

Figure 9:
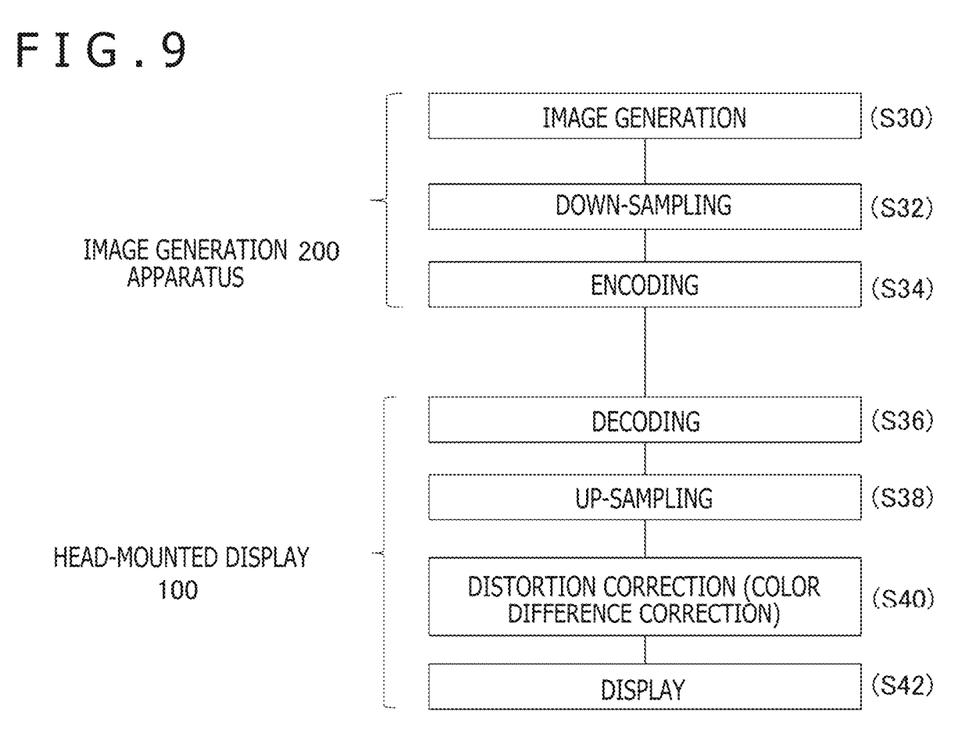
FIG. 9 is a diagram depicting a processing procedure in which an image is displayed by cooperation of the image generation apparatus and the head-mounted display in the present embodiment.

Now, operation of the image displaying system that can be implemented by the configuration described above is described. FIG. 9 depicts a processing procedure of causing an image to be displayed by cooperation of the image generation apparatus 200 and the head-mounted display 100 in the present embodiment. FIG. 9 depicts a process for displaying one frame of a moving image, and actually, processing steps may be executed in parallel to carry out generation, transmission, and displaying of an image in the pipeline. Further, the particular method of the process is exemplary and does not restrict the present embodiment.

First, the image generation section 262 of the image generation apparatus 200 generates an image having no distortion, by setting a viewscreen on the basis of the position and the posture of the head of the user acquired by the state information acquisition section 260 and projecting a three-dimensional object, for example (S30). This image corresponds to the image 16 of FIG. 4 or the stereo image including the left eye image 18a and the right eye image 18b and is a typical image in which individual pixels are not displaced at all and have RGB pixel values. The image generation section 262 may further provide distortion at a rate common to all of the RGB planes.

Then, the down-sampling section 266 converts the RGB image data generated by the image generation section 262 into a YUV image and then down-samples the YUV image into a format of YUV420 or the like (S32). Then, the transmission section 270 encodes the YUV image by a predetermined method such as H.265/MPEG-H HEVC (S34), for example, and then transmits resulting data to the head-mounted display 100.

The image data acquisition section 278 of the head-mounted display 100 receives and decodes the data (S36). This data has the format of, for example, YUV420. Then, the up-sampling section 280 enlarges the U and V planes that are in a reduced state to the original size and then converts a resulting YUV image into an RGB image (S38). For example, the up-sampling section 280 converts the data of YUV420 into data of YUV444 to determine YUV values for each pixel of the display image and calculates RGB values by using the determined values.

Next, the distortion correction section 282 provides distortion to the planes of R, G, and B at degrees different from each other as described hereinabove, to generate an image having color drift (S40). The display section 284 outputs the image having the color drift generated in such a manner to the display panel (S42). When the image displayed in such a manner is appreciated through the eyepieces, the image having no distortion and no color drift is visually recognized.

Figure 10:
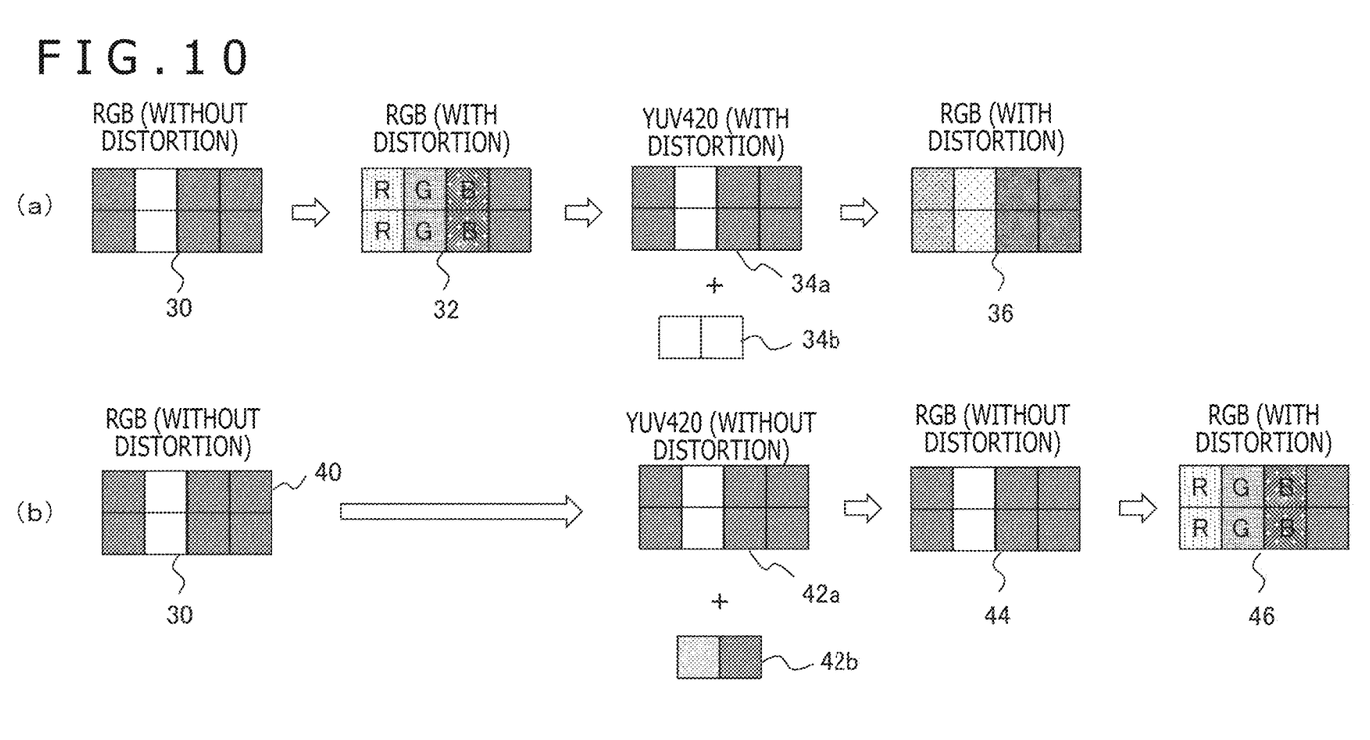
FIG. 10 depicts views each illustrating a difference in loss of color information that depends upon a timing at which distortion correction corresponding to chromatic aberration is performed.

FIG. 10 depicts views each illustrating a difference in loss of color information, which depends upon a timing at which distortion correction corresponding to chromatic aberration is performed. In FIG. 10, a rectangle of a minimum unit corresponds to one pixel, and transition of data of a pixel block including four pixels in the horizontal direction and two pixels in the vertical direction is indicated in the rightward direction. (a) relates to a case in which the image generation apparatus 200 performs distortion correction corresponding to chromatic aberration before down-sampling, and (b) relates to a case in which the head-mounted display 100 performs distortion correction corresponding to chromatic aberration after up-sampling as in the present embodiment.

In the case of (a), an RGB image 30 on which display is to be based is generated first by the image generation apparatus 200. In the present example, from within the pixel block, two pixels in the second column from the left are white, and the other six pixels are black. It is to be noted that, although each pixel value actually includes three components of R, G, and B, in (a) of FIG. 10, it is represented in a blended color of them to be represented, for ease of understanding.

If distortion is provided at a degree different for each primary color to the image 30, then the boundary position between different representation colors is displaced among R, G, and B as described hereinabove with reference to FIG. 5. As a result, in the example depicted, generated is an image 32 in which the two pixels in the left end column are R (red), the two pixels in the second column are G (green), the two pixels in the third column are B (blue), and the two pixels in the fourth column are black. If the image 32 having such RGB components as just described is converted into YUV components and then the U and V planes are down-sampled, then a Y image 34a and another Y image 34b are obtained.

In the case of YUV420, as depicted in (a) of FIG. 10, the size of the Y image 34a remains the original size, and the Y image 34b is reduced to a ¼ size with the data averaged for every 2×2 pixels. If such an image having distortion as just described is generated on the image generation apparatus 200 side and transmitted, then it is only necessary for the head-mounted display 100 to up-sample and display the image. However, the image 36 formed by the up-sampling has loss in the information regarding a color difference.

In particular, in the example depicted, since color differences of 2×2 pixels are averaged to that of one pixel, clear luminances of R, G, and B having dispersed for each one pixel in the horizontal direction on the image 32 become dull by blending with neighboring pixels. With the human visual characteristic taken into consideration as described above, although such a difference as just described is less likely to be recognized on an ordinary image, in the case of adjustment in a unit of a pixel where refraction of light is taken into consideration as in correction of chromatic aberration, it can be supposed that, as the correction result changes, a false color looks outstanding.

In the procedure of (b) according to the present embodiment, the image generation section 262 of the image generation apparatus 200 first generates an RGB image 30 on which display is to be based, as in (a). Then, the down-sampling section 266 performs down-sampling while the state before distortion is provided is maintained. Also in the present example, if YUV420 is assumed, then a Y image 42a of the original size and a UV image 42b reduced to ¼ are obtained.

In the head-mounted display 100, the up-sampling section 290 enlarges the UV image 42b and then converts it into an RGB image 44. Also in this case, since information regarding a color difference to be transmitted is averaged for each 2×2 pixels, the image 44 is technically different from the original image 30. However, since correction relating to the chromatic aberration has not been performed unlike in the image 32 of (a), the correction result naturally does not suffer from loss.

Thereafter, the distortion correction section 282 provides distortion with a degree different for each primary color to the RGB image 44. Consequently, obtained is an image 46 in which the boundary position between different representation colors is displaced among R, G, and B and clear luminances of R, G, and B substantially similar to those in the image 32 appear for each pixel. In such a manner, in a case where down-sampling of data is performed for transmission, by carrying out correction for chromatic aberration on the head-mounted display 100 side after up-sampling, information regarding color drift in a unit of a pixel can be represented without any loss.

Figure 11:
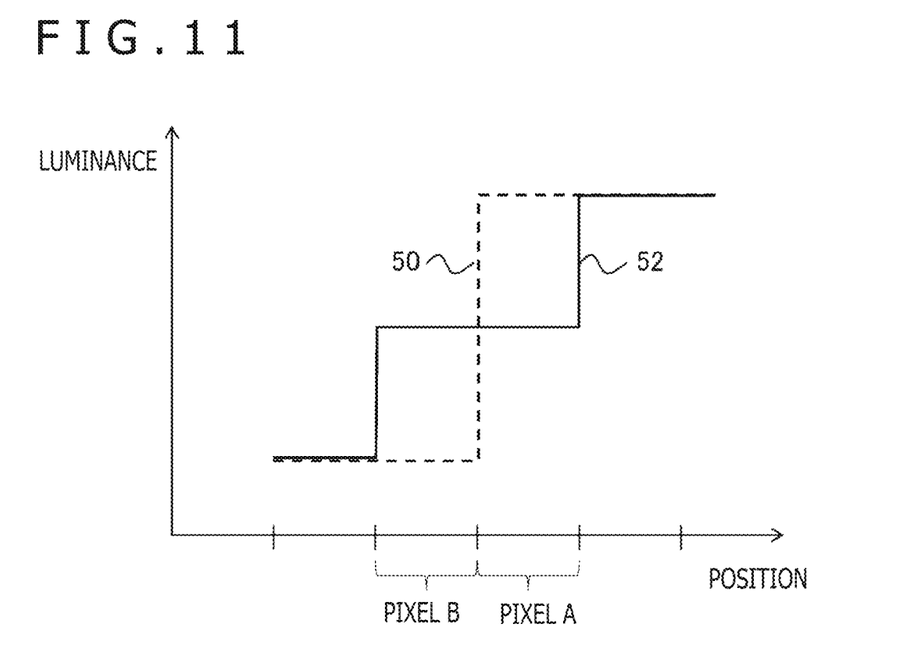
FIG. 11 is a view illustrating an influence of downsampling in the procedure of (a) of FIG. 10.

FIG. 11 is a diagram illustrating an influence of down-sampling in the procedure of (a) of FIG. 10. Since distortion correction for each color is based on a spectral characteristic of the lens, in an image after correction, a specific primary color appears on the boundary between representation colors or the like in such a manner as to protrude with a very small width of approximately one pixel from a different primary color. In FIG. 11, a variation of the luminance of the specific primary color with respect to a pixel position is exemplified. As indicated by a broken line, a luminance variation 50 after correction changes suddenly between adjacent pixels A and B.

If the luminance values of the pixels A and B are averaged by down-sampling, then qualitatively the luminance of the pixel A that originally has a high luminance decreases while the luminance of the neighboring pixel B that originally has a low luminance increases, as indicated by a luminance variation 52 indicated by a solid line. As a result, the width with which the specific primary color protrudes is expanded or the representation color changes by blending with the different primary color, which gives an unnatural impression to the user when the user views the image that has been subjected to correction. Such an influence as just described becomes more conspicuous as the dynamic range or the gradation of the pixel value increases. Accordingly, especially in a mode in which an abundant image representation is implemented by the HDR (High Dynamic Range) or the like, the effect by the present embodiment increases.

According to the present embodiment described above, the head-mounted display acquires down-sampled image data from the image generation apparatus, up-samples the image data, performs distortion correction for a color difference, and then displays the resulting image data. Consequently, it is possible to achieve both reduction of the size of data to be transmitted and quality of an image when it is appreciated through the lens. As a result, even if the head-mounted display is made a wireless one, an image of high quality can be displayed stably, so that reduction in weight of the head-mounted display can be achieved, and difficulty in movement of the user upon cable routing or the like can be dissolved.

The present invention has been described in connection with the embodiment. The embodiment is exemplary, and it can be recognized by those skilled in the art that various modifications are possible in the combination of the components and the processes and that also such modifications fall within the scope of the present invention.

For example, in the present embodiment, presupposing that the image generation apparatus 200 performs down-sampling in order to reduce the data size, up-sampling and distortion correction for chromatic aberration by the head-mounted display 100 side are carried out in a set. On the other hand, an alternative case in which the image generation apparatus 200 does not perform down-sampling may be permitted such that distortion correction for chromatic aberration can be carried out by the image generation apparatus 200 side.

In this case, the image generation section 262 of the image generation apparatus 200 determines whether or not down-sampling of image data is to be performed, according to a characteristic of an image to be generated, settings, and so forth. In a case where down-sampling is not to be performed, the image generation section 262 performs distortion correction for chromatic aberration for the generated image and then supplies data of the resulting image to the transmission section 270. The transmission section 270 transmits information regarding whether or not down-sampling has been performed to the head-mounted display 100 together with the image data.

The image data acquisition section 278 of the head-mounted display 100 changes over the supply destination of the image data on the basis of the information. In particular, if down-sampling has been performed, then the image data acquisition section 278 supplies the image data to the up-sampling section 290. Consequently, the operation of the embodiment described hereinabove is implemented. On the other hand, if down-sampling has not been performed, then the image data acquisition section 278 supplies the image data to the display section 284. Consequently, the processing by the head-mounted display 100 side can be minimized, and display with low delay becomes possible.

INDUSTRIAL APPLICABILITY

As described above, the present invention can be used in an image displaying system, various kinds of information processing apparatuses such as an image generation apparatus, a head-mounted display, a game apparatus, and an image display apparatus, an image processing system that includes any one of them, and so forth.

REFERENCE SIGNS LIST

100: Head-mounted display
110: Stereo camera
120: CPU
122: Main memory
124: Display section
132: Communication section
134: Motion sensor 200: Image generation apparatus
222: CPU
224: GPU
226: Main memory
260: State information acquisition section
262: Image generation section
264: Image data storage section
266: Down-sampling section
270: Transmission section
276: State information transmission section
278: Image data acquisition section
280: Up-sampling section
282: Distortion correction section
284: Display section

The invention claimed is:

1. An image displaying system comprising:
an image generation apparatus configured to down-sample image data of an image to produce down-sampled image data and transmit the down-sampled image data corresponding to the image to a display apparatus; and
the display apparatus configured to:
up-sample the down-sampled image data to produce up-sampled image data corresponding to the image,
generate a modified image corresponding to the image by applying a distortion correction to the up-sampled image data, wherein applying the distortion correction comprises applying an opposite change to a change corresponding to chromatic aberration of the eyepiece of the display apparatus and for each primary color of a plurality of primary colors of the image; and
display, through the eyepiece, the modified image.

2. The image displaying system according to claim 1, wherein
the image generation apparatus is configured to convert data of three primary colors of the image into luminance data and color difference data and down-sample the color difference data; and
the display apparatus is configured to up-sample the color difference data, convert the up-sampled image data into data of the three primary colors, and apply the distortion correction for planes of the three primary colors to generate the modified image.

3. The image displaying system according to claim 1, wherein the image generation apparatus is configured to compress and encode the down-sampled data of the image to produce compression encoded data and then transmits the compression encoded data by wireless communication to the display apparatus.

4. The image displaying system according to claim 1, wherein
the image generation apparatus is configured to down-sample the image data in which common distortion is applied to all primary colors and transmit the down-sampled data; and
the display apparatus is configured to generate the modified image by applying, to the up-sampled image, distortion correction for providing a remaining change from within the opposite change, for each primary color.

5. The image displaying system according to claim 1, wherein
the image generation apparatus is further configured to:
apply the distortion correction to second image that is not down-sampled to produce second modified image data, and
transmit information whether or not the second modified image data is down-sampled and the second modified image data to the display apparatus; and
the display apparatus is configured to
up-sample the second modified image data or display the second modified image based on the information whether or not the second modified image data is down-sampled.

6. A display apparatus being in communication with an external image generation apparatus, the display apparatus comprising:
an image data acquisition section configured to acquire image data, corresponding to an image, transmitted from the external image generation apparatus, part of the image data being in a down-sampled state;
an up-sampling section configured to up-sample the part of the image data in the down-sampled state;
a distortion correction section configured to generate a modified image by providing a distortion correction to the up-sampled image, the distortion correction comprising applying an opposite change to a change corresponding to chromatic aberration of an eyepiece of the display apparatus and for each primary color of the image; and
a displaying section configured to display, through the eyepiece, the modified image.

7. An image displaying method performed by a display apparatus, the display apparatus being in communication with an external image generation apparatus, the image displaying method comprising:
acquiring, by the display apparatus, data of an image transmitted from the external image generation apparatus, part of the data being in a down-sampled state;
up-sampling, by the display apparatus, the part of the data that is in the down-sampled state;
generating, by the display apparatus, a modified image by providing a distortion correction to the image data including the up-sampled image data, the distortion correction comprising an opposite change to a change corresponding to chromatic aberration of the eyepiece, for each primary color; and
displaying, through the eyepiece, the modified image.

8. A non-transitory, computer-readable storage medium containing a computer program, which when executed by a computer, causes the computer cause a display apparatus to perform operation of an image displaying method, the operations comprising:
acquiring, by the computer in the display apparatus, image data of an image transmitted from an external image generation apparatus, part of the image data being in a down-sampled state by the external image generation apparatus, the display apparatus being in communication with the external image generation apparatus;
up-sampling, by the computer in the display apparatus, the part of the image data that is the down-sampled state;
generating, by the computer in the display apparatus, a modified image by applying a distortion correction to the up-sampled-image data, the distortion correction comprising an opposite change to a change corresponding to chromatic aberration of the eyepiece and for each primary color; and
displaying, through the eyepiece of the display apparatus, the modified image.

9. The display apparatus according to claim 6, wherein the up-sampling section is configured to up-sample color difference data associated with the image, convert the up-sampled image data into data of the three primary colors, and apply the distortion correction for planes of the three primary colors to generate the modified image, wherein the color difference data is received from the external image generation apparatus in a down-sampled state, the color difference data being a component of the three primary colors of the image.

10. The display apparatus according to claim 6, wherein the down-sampled data of the image in a compressed and encoded state and acquired by wireless communication between the display apparatus and the external image generation apparatus.

11. The display apparatus according to claim 6, wherein the down-sampled image data comprises common distortion applied to all primary colors; and
the up-sampling section is configured to generate the modified image by applying, to the up-sampled image, distortion correction for providing a remaining change from within the opposite change and for each primary color.

12. The method according to claim 7, wherein the up-sampling comprises:
up-sampling color difference data associated with the image,
converting the up-sampled image data into data of the three primary colors, and
applying the distortion correction for planes of the three primary colors to generate the modified image, wherein the color difference data is received from the external image generation apparatus in a down-sampled state, the color difference data being a component of the three primary colors of the image.

13. The method according to claim 7, wherein the acquiring comprises:
acquiring, wirelessly from the external image generation apparatus, the down-sampled data of the image in a compressed and encoded state.

14. The method according to claim 7, wherein the down-sampled image data comprises common distortion applied to all primary colors; and the up-sampling comprises:
generating the modified image by applying, to the up-sampled image, distortion correction for providing a remaining change from within the opposite change and for each primary color.

15. The non-transitory computer-readable media of claim 8, wherein the up-sampling comprises:
up-sampling color difference data associated with the image,
converting the up-sampled image data into data of the three primary colors, and
applying the distortion correction for planes of the three primary colors to generate the modified image, wherein the color difference data is received from the external image generation apparatus in a down-sampled state, the color difference data being a component of the three primary colors of the image.

16. The non-transitory computer-readable media of claim 8, wherein the acquiring comprises:
wirelessly acquiring, from the external image generation apparatus, the down-sampled data of the image in a compressed and encoded state.

17. The non-transitory computer-readable media of claim 8, wherein the down-sampled image data comprises common distortion applied to all primary colors; and the up-sampling comprises:
generating the modified image by applying, to the up-sampled image, distortion correction for providing a remaining change from within the opposite change and for each primary color.

18. The image displaying system according to claim 1, wherein the distortion correction is applied such that a degree of distortion increases toward peripheral portions of the image.

19. The image displaying system according to claim 1, wherein the distortion correction is applied such that a degree of distortion differs among the primary colors.

20. The image displaying system according to claim 1, wherein the image generation apparatus is configured to identify a position of a viewpoint and a direction of a visual line on the basis of a position of the head and the posture of a user wearing the display apparatus.

* * * * *